Patented Jan. 30, 1951

2,539,975

UNITED STATES PATENT OFFICE 2,539,975

PROCESS FOR IMPROVING THE DRYING QUALITIES OF TALL OIL

William C. Spitzer, Chicago, Ill., and Russell T. Ryan, Hammond, Ind., assignors to The Sherwin-Williams Company, Cleveland, Ohio, a corporation of Ohio No Drawing. Application October 14, 1948, Serial No. 54,576

11 Claims. (Cl. 260—97.5)

This invention relates to a method for the improvement of the drying qualities of crude tall oil and the polyhydric alcohol esters of crude tall oil and direct usage thereof in varnish manufacture.

Tall oil is a by-product derived through the sulfate process for the manufacture of cellulose from wood pulp. The wood pulp source is usually coniferous trees, and the tall oil upon recovery is a dark, almost black, foul smelling liquid consisting of a mixture of from 35% to 55% mixed saturated and unsaturated fatty acids, containing principally oleic, linoleic and linolenic acid, about 40% to 50% of rosin acids, and from 5% to 15% of unsaponifiable material. The latter includes minor amounts of sterols, lignins, mercaptans and other complex organic compounds. The unsaponifiable materials are apparently the source of color forming bodies and of materials which exert strongly antioxidant effects upon the drying oil fatty acids which form a large part of the composition of tall oil crudes. The above identified crude tall oil mixture is sometimes referred to herein as "crude tall oil acids."

As tall oil crudes are readily available, there has been considerable amount of work done to develop ways and means of purifying the various ingredients naturally occurring in tall oil for a variety of uses including the manufacture of soap, paints, floor coverings and water-proofing pitches. Probably the greatest effort so far has dealt with methods of separation and purification of the various constituents. So far as is known, there have been very few attempts to utilize crude tall oil directly in the manufacture of a varnish vehicle.

The composition of crude tall oils varies with the kind of conifer selected for wood pulp manufacture, the location in which the trees originated, the season of the year the trees are cut, and variations in the chemical processing techniques used for the production of the paper pulp. Naturally, these variations introduce other variations in composition of the rsultant crude tall oil and are reasons for the apparent necessity of a variation in the techniques employed in many processes for modifying tall oil crudes. Methods priorly suggested for the improvements of tall oil are concerned with treating the crudes with sulfuric acid, or other acidic material, decolorizing with activated earths, such as decolorizing clays, fuller's earth, bentonite, etc., and activated carbon. Processes have been suggested wherein the crude tall oil is distilled at sub-atmospheric pressures, with or without the use of steam, to improve the color. Most of the distillation processes heretofore suggested yielded fractions possessing strong odors which contaminated the distillate.

While the literature states that tall oil will dry in the presence of heavy metals (e. g., cobalt, lead and maganese salts) the rate and type of drying leaves much to be desired. Tall oil drying is thoroughly impractical from the viewpoint of successful protective coating formulations of the present day.

One object of the invention is to treat crude tall oil chemically so as to decompose or inactivate the antioxidant materials included in the crude tall oil.

Another object is to process a crude tall oil so as to alter the character of the rosin and fatty acid components to cause the resultant oil to dry more rapidly than crude tall oils not so treated.

Another object is to process tall oil so that the tendency for rosin acids to crystallize out of the combination is thereby inhibited. Other objects will appear hereinafter.

The method of this invention is to process a crude tall oil by heating the crude in a suitable vessel equipped with a cover and a blowing ring, so that gases may be admitted therethrough, and the vessel further equipped so that it can be heated to oil processing temperatures within a reasonable length of time. After, or shortly before reaching the desired temperature range, air or other oxygen liberating gas is forced through the hot crude oil for from 2 to 8 hours, depending upon the temperature and rate of blow. An altered tall oil results which is improved in quality as a result of the processing.

It has been found that there is a correlation between the processing time, the processing temperature, and the rate of blow in relation to the drying characteristics which are obtained from a given crude. In general, the temperature should be within the range of 200 degrees C. to 300 degrees C. In the preferred operation, the crude tall oil is weighed into a suitable vessel, heated to a temperature of from 260 degrees C. to 280 degrees C., and thereafter the temperature is held at some point within the range while the heated oil is blown with air at such a rate so that in from 2 to 5 hours the acid value of the processed tall oil is progressively reduced from an acid value of 170, the acid value of the crude, to a value of between 130 and 140.

If the blowing rate is too low, more time than that indicated will be found necessary to reduce the acid value of the unesterified process crude to below 140, and the tall oil acids when blown for excessively long periods of time do not develop the optimum drying qualities after esterification. It is to be noted that acid values have served merely to indicate condition of the reaction, and it is not meant to infer that other acid values, under varying processing techniques might be suitable check points. This latter point is particularly pertinent in reference to processing in the presence of polyhydric alcohols where esterification and blowing are conducted simultaneously. Drying properties are not, therefore, a function of acid value, but acid value is merely an indication of the state of the process. That actual decarboxylation does not occur is indicated by the fact that upon distillation of the processed acids, the body gained is lost, and the original acid value of from 170 to 175 is regained. Yet the oil, as a substantially neutral polyester, has markedly improved drying characteristics. If the temperature is held within a preferred range, the acid value should fall to below 140 within a five-hour period. If such a result is not obtained, it is an indication that the air blow is at too low a rate. On the other hand, if the throughput of oxygen liberating gas is too high, the exothermic reaction which results will not only increase the difficulty of temperature control within the range, but may also oxidize the tall oil acids to a point where their subsequent use in varnish manufacture is extremely limited.

Hopfer-Herminghaus, German Patent No. 722,247, shows the heating of a tall oil from 80 degrees C. to 200 degrees C. for some 40 to 60 hours. After such treatment, the oil is found to have been hydroxylated or, in other words, there has been an addition of hydroxyl groups to the structure of the oil. By further treatment with polybasic acids and polyhydric alcohols, the identified patentees show dehydroxylation of the oil and further esterification to produce a tall oil type varnish.

Quite similarly, U. S. Patent No. 1,938,532 teaches a process for refining tall oil wherein the oil is blown at low temperatures (82 degrees C. to 193 degrees C.) for from 20 to 50 hours, preferably in the presence of oxygen liberating per compounds. The product resulting is a heavy bodied material of low iodine value indicating poor drying quality. Under the process herein disclosed, the oil is essentially unbodied, and is possessed of enhanced drying quality.

It may be pointed out that the process of the present invention is carried out in a temperature range sufficiently high that hydroxylation of the tall oil does not occur. It is believed that there is some isomerization of the rosin and oil during the reaction period and that hydrogen is probably split off. There is some basis for believing that the oxygen of the air strips off hydrogen to form water as a by-product and causes changes in the unsaturation of the acids under process. The rosin content and saponification value of the product during the process remains substantially unchanged. However, the acid value is lowered considerably, and it is probable that a lactone ring or interester is formed intermediately. If, for example, the acid value of the oil is 175 to start, after blowing it will be found to decrease to less than 140, depending, as indicated, upon the rate of blow, yet upon esterification the acid value of products is too high if an amount of a polyhydric alcohol is used based on the acid value of processed oil. Excess polyhydric alcohol is required to produce neutral esters.

While all experience so far in application of the process has been accomplished in a varnish kettle by conventional techniques of varnish making and the use of a blow ring, it is apparent that a processing system can be used wherein the hot oil is spread out in thin films so as to afford increased contact with the oxygen liberating gas. A system can be employed wherein the hot tall oil is allowed to flow downward through a packed column or tower and at the same time forcing air, or other oxygen liberating gas upward in counter-current flow to the oil through the said column. Vapor phase treatment of the tall oil crude acids is also indicated in some preliminary work to have considerable possibility. In short, it is desirable that there be a large surface contact between the oxidizing gas and the oil and many ways of achieving this end may be employed.

It has been known for some time that highly bodied oils have been produced from linseed oil by heating and blowing at high temperatures. Oils so treated contain only minor amounts of impurities detrimental to drying characteristics and contain only minor amounts of acidic material whereas tall oil contains from 5% to 15% of unsaponifiable matter having a deleterious effect upon the quality of combined acids of crude tall oil and contains in excess of 85% varied type acidic materials.

In the practice of the invention, it is preferable to start with an unesterified tall oil crude. A process time of from 2 to 5 hours at a temperature of from 260 degrees C. to 280 degrees C. with a stream of air being passed through the oil mass at a sufficient rate to achieve an active turbulence within the oil, and yet not so rapid as to allow the exothermic reaction within the mass to increase at such rate as to be uncontrollable, is preferred. By one modification, to the crude tall oil during the blowing process theoretical amounts of a polyhydric alcohol, e. g., glycerine, are added in sufficient amount (e. g., a slight excess over theoretical) to form a neutral ester of the acidic crude. Small amounts of an esterification catalyst, e. g., litharge, can also be added, and upon processing the reactants together as above, an essentially neutral, improved drying, tall oil is formed. In the preferred method of processing the crude tall oil, it is better not to form the ester during the blowing process due to the dark color of the resulting product. A desirable, but not essential, additional step involves distillation of the processed crude under reduced pressures to produce light colored drying materials. If the ester is first formed, distillation of the end product becomes practically impossible except by molecular distillation.

After the processing of the acidic tall oil crude, the body of the product remains relatively thin and only slightly heavier than the original crude. During processing the acid value falls to below 140 and the rosin acids do not crystallize out even after extended periods of time in storage. Tall oil, upon aging without treatment, will be observed to contain crystallized rosin acids and sludge. When the crude tall oil has been processed as above, it may be refined by a number of known methods such as distillation (suggested above), acid refining, bleaching or decolorization with activated inorganic material. It is not necessary that the processed crude be further refined, for it can be esterified and used as a vehicle in dark colored paints, printing inks, roofing compositions, and other compositions with advantage. It is to be noted that a varnish vehicle formed directly through esterification of the processed crude tall oil has an oil length of approximately 12½ gallons (oil length is defined as the number of gallons of oil per hundred pounds of resin). Such a varnish vehicle would be expected to be rather brittle, but it has been noted that in a tall oil reformed in accordance with this process, embrittlement occurs more slowly and films are slightly tougher than comparable unprocessed tall oil ester films.

The practice of the invention may be illustrated by the following examples.

Example I

A stainless steel kettle eight inches in diameter and ten inches deep was filled to three quarters of its capacity with a crude tall oil.

The kettle was equipped with a blow ring and a thermometer through appropriate holes in a cover for the kettle. There was an additional one inch hole in the cover through which gases could be exhausted.

The following is a log of a batch made with the above crude tall oil:

The fire was started at 10:25 a. m. At 10:40 a. m. the temperature was up to 120 degrees C., and the air blow through the kettle was started at the rate of 0.5 cu. ft./min., which rate was maintained. At 11:40 a. m. the temperature was 270 degrees C. The temperature was held at 270 degrees C. until 2:40 p. m. when the fire was turned off and the air blow stopped.

The product had an acid value of 137 and the color was extremely dark. The loss from the batch was 14.7% by weight during processing. The viscosity was 20 seconds in a Gardner tube.

Example II

Two hundred fifty (250) parts of the product of Example I, 25.6 parts glycerine (10% excess) and 1.25 parts litharge were placed in a three neck flask fitted with agitator, blow ring, and a thermometer. The reactants were heated to 180 degrees C. with a carbon dioxide blanket, and held for one hour. The temperature was raised to 285 degrees ± 5 degrees C. and held until the acid value was 8, which required about 5 hours.

The resulting polyester was reduced to 60% solids with mineral spirits. Then 0.5% by weight of lead and 0.05% by weight of cobalt as their napthenates were added as driers on the basis of the solids, and a 0.003 inch film was drawn down on glass with a comparable composition using a crude tall oil, not processed, but similarly esterfied, herein called the control.

The setting time and the tack free drying time were observed as follows:

|  | Setting Time | Tack Free Drying Time |
|---|---|---|
| Control | 12 hours | 36 hours plus. |
| Processed oil | 2¼ hours | 16 hours. |

A sorbitol ester of tall oil was prepared the same as above, replacing the glycerine with equivalent amounts of sorbitol (calculating sorbitol as containing four reactive hydroxyl groups).

The results were as follows:

|  | Setting Time | Tack Free Drying Time |
|---|---|---|
| Control (Sorbitol ester) | 2 hours | 6 hours. |
| Processed oil (Sorbitol es.) | 1 hour | 3½ hours. |

Example III

In a three neck glass flask equipped with a thermometer and a blow ring were weighed:

300 parts crude tall oil
30 parts glycerine

A log of the process conditions was as follows:

9:00 a. m.—Fire started.
9:30 a. m.—Temperature 130 degrees C. Started a vigorous air blow giving a turbulent agitation of the reactants.
11:30 a. m.—Temperature 130 degrees C. Fire increased, continued the blow.
3:00 p. m.—Temperature 270 degrees C. Blowing continued.
11:00 p m.—270 degrees C. Fire off.

The acid value of the product was found to be 9. The product was very dark. Upon reduction with mineral spirits to 70% solids and with driers added as in Example II, the setting time was 2½ hours compared to control having a set time in excess of 10 hours.

The product could not be vacuum distilled, but was found suitable for use in dark colored paints and enamels.

It is also possible that the resultant product could be molecularly distilled at such cost as would be economically feasible. This additional process would allow use of the product in whites and light colored products.

Acid refining and the use of decolorizing clays produces color improvement where the requirements for color are not exacting.

Example IV

This example is illustrative of plant size operations. A 150 gallon capacity stainless steel kettle equipped with blow ring, cover and thermometer, approximately 4½ feet deep was charged with 830 pounds of crude tall oil.

A log of the cook was as follows:

9:00 a. m.—Fire started.
9:30 a. m.—Temperature 250 degrees F. (121 degrees C.) Started a vigorous air blow which maintained the oil in an active turbulent state.
10:45 a. m.—Temperature 520 degrees F. (271 degrees C.) Maintain air blow.
12:30 p. m.—Temperature 520 degrees F.—Fire off and cut air blow. Cool.

There was an 85% recovery of the material input. The acid value of the batch was found to be 132, the color 18 Gardner, and the viscosity 27 seconds on a Gardner tube (i. e., 27 seconds were required for a bubble to travel the length of the standard tube at 77 degrees F.).

A triglyceride, made with this product as in Example II had a "setting time" of 2¾ hours. The setting time of the control was in excess of 7 hours.

Example V

This example is included merely to illustrate an acid purification of the processed oil of Example IV.

1000 parts the processed crude oil of Example IV.
1000 parts of an aliphatic hydrocarbon solvent averaging eight carbon atoms per molecule.

The batch was well agitated and 60 parts of commercial sulfuric acid were added slowly to the oil solvent blend. Agitation was continued for one hour and the phases were allowed to separate. The water was removed by decanting and the acid treated oil subjected to vacuum distillation to remove the solvent. The color of the batch after treatment was 15 on the Gardner scale.

*Example VI*

This example illustrates a distillation method for the purification of a processed tall oil (not esterified) using the product of Example IV.

A three neck flask was equipped with a dropping funnel, thermometer, a distilling bulb, a receiver and a vacuum source. A vacuum of 10 inches of Hg was maintained over the system and the processed crude tall oil was admitted dropwise onto the bottom of the flask, which was maintained at 280 degrees ±10 degrees C. The processed tall oil was thereby flash distilled at a vapor temperature of 270 degrees ±10 degrees C. The yield was lower than achieved by later applied commercial techniques, and was 66% of the oil input. Twenty-four per cent (24%) residual material was recovered as still bottoms. The acid value had increased in the distillate to nearly the original value, e. g., 170. The color was found to be 7–8 on Gardner scale, and the viscosity of the distillate was extremely thin, being 2–3 seconds on Gardner tube. Upon forming a glyceride ester of the distillate of acid value of 7, and adding driers as in the previous examples, the composition set-to-touch in 2½ hours, a time comparable with the processed esterified crude before purification.

*Example VII*

This example illustrates a low temperature limitation of crude tall oil processing. In equipment identical to that used in Example I a 10 pound charge of crude oil was weighed in:
A log of the cook follows:

8:30 a. m.—Fire started.
9:15 a. m.—Temperature 170 degrees C. Started to blow with 0.5 cubic foot per minute of air which gave an active turbulent agitation of the batch.
10:15 a. m.—Temperature 170 degrees C. Temperature held and same blow rate continued.
4:30 p. m.—Temperature 170 degrees C. Acid value 152.
9:30 p. m.—Temperature 180 degrees C. Acid value 143.
11:30 p. m.—Temperature 170 degrees C. Acid value 136. Fire off—blow stopped.

A glycerine ester prepared from the processed oil was made, as previously shown, which was found to set in 7 hours. This result, while superior to a crude ester, which set under the same conditions in 10 hours, indicates that the process conditions used were not sufficient to produce the optimum result

*Example VIII*

In equipment identical to that used in Example I, a 10 pound charge of crude tall oil was weighed in and the log of the cook was as follows:

8:25 a. m.—Fire started.
8:40 a. m.—Temperature 160 degrees C. Air blow started at 0.013 cu. ft./minute.
9:30 a. m.—Temperature 270 degrees C. Same air blow rate maintained.
3:30 p. m.—Temperature 270 degrees C. Acid value 148. Too high. Air blow rate increased to 0.06 cu. ft./minute. Temperature held at 270 degrees C.
6:30 p. m.—Acid value 140. Should be all right. Fire off—blow stopped.

The glyceryl ester was formed as previously described, to produce a product of an acid value of 10. This was reduced to 70% solids and the driers added as before. The control "set" in 9 hours. The above processed oil "set" in 8 hours.

This example illustrates a blow rate with air too low to accomplish the desired change in the crude tall oil. It will be observed that 8 hours were required at 270 degrees C. to get the acid value down below 145. A blow rate is preferred which will reduce the acid value of the crude tall oil to less than 140 within the preferred temperature range in from two to five hours.

*Example IX*

A test run was made using the same size batch as in Example VIII in the identical equipment. The batch was blown at as high an input rate of air as possible and still keep the oil in the kettle. It was found that the reaction became so exothermic that there was little control of the temperature and the test run was stopped.

The trial illustrated that the air blow could not be too rapid in rate or the exothermic reaction would not allow proper temperature control.

In the experimental kettle it was found that an air blow rate of 0.4 cu. ft./minute of air was most economical and gave the optimum blow rate within the preferred temperature range, i. e., 260 degrees C. to 280 degrees C. The rate can be translated to larger installations by a study of the blowing rate at a constant temperature compared with the decrease in acid value. An acid value of less than 140 should be achieved in from 2 to 5 hours to obtain optimum results.

In the foregoing examples it will be noted that much of the work was done in a laboratory size kettle wherein the air blowing rate was measured. It is obvious that if the size of the batch is increased to larger and larger vessels, it will be necessary to change the rate of air blow through the oil, to compensate at least partially for the increased area of the production equipment used. Indications are, however, that in larger scale operations the air requirements are less than directly proportionally to the increase in size of the processing vessel over the laboratory unit.

The expression "active turbulent agitation" is meant to define and include that rate of passage of air or other oxygen liberating gas through a given mass of oil which will produce a degree of agitation equivalent to that produced by passing the same gas through a batch of oil in a 10 inch high cylindrical laboratory kettle, 8 inches in diameter, filled to ¾ of its capacity, at a gas blow rate of from more than 0.06 cu. ft./min. to less than that rate wherein the exothermic reaction between the oxygen liberating gas and the constituents in the tall oil become uncontrollably rapid under the given temperature conditions. The optimum rate, i. e., the one giving the most rapidly drying oil in a minimum of time, was found to be about 0.4 cu. ft./min. in the laboratory kettle.

While it is impractical to attempt to define numerically the rate of air blow necessary in various size kettles, it has been observed that in both laboratory batches blown at a rate of about 0.4 cu. ft./min. of air, and plant batches blown at a rate necessary to produce an acid value below 140 within a time from 2 to 8 hours, a foam of about one inch in depth formed upon the surface of the oil during the blowing process. This depth of foam on the surface of the oil is also a measure of the proper blow rate and further defines "active turbulent agitation."

In the preceding examples, it has been shown that crude tall oils processed according to the disclosure dry with much greater rapidity than do the tall oil esters made without benefit of treatment.

"Setting time" is meant to define the time required to elapse before the varnish vehicle applied in a thin film can be lightly pressed with a finger tip without removal of a part of the surface of the film upon removal of the finger tip from the film surface.

"Tack free" time is meant in the specification to define that condition of drying of an applied varnish film where, after firmly pressing a 2" x 2" square of slightly concaved aluminum foil against the film (to assist adhesion), a light tap on the corner of the aluminum square will release any developed bond between the varnish film and the surface of the aluminum foil.

The term "varnish vehicle" broadly includes any liquid composition convertible to a transparent or translucent solid by chemical reaction in the presence of air or evaporation of a solvent after application of the composition in a thin film upon a supporting surface.

The acid value of an oil, resin, or varnish is defined as the number of milligrams of potassium hydroxide equivalent to one gram of the substance.

The invention is hereby claimed as follows:

1. A process for the manufacture of a varnish vehicle which comprises heating an oil-like unsaturate selected from the group consisting of crude tall oil acids and the polyhydric alcohol esters thereof, to a temperature within the range of from 200 degrees C. to 300 degrees C., vigorously blowing an oxygen liberating gas therethrough and maintaining said reaction conditions thereafter for from 2 to 8 hours.

2. A process for the manufacture of a varnish vehicle which comprises heating an oil-like unsaturate selected from the group consisting of crude tall oil acids and the polyhydric alcohol esters thereof, to a temperature within the range of from 200 degrees C. to 300 degrees C., vigorously blowing air therethrough at such a rate as will maintain active turbulent agitation of the said oil but at insufficient rate to allow the exothermic reaction resulting to increase the temperature above the stated range.

3. A process for the manufacture of a varnish vehicle which comprises heating an oil-like unsaturate selected from the group consisting of crude tall oil acids and the polyhydric alcohol esters thereof, to a temperature within the preferred range of from 260 degrees C. to 280 degrees C., vigorously blowing air therethrough at such a rate as will maintain active turbulent agitation of the said oil and maintaining said reaction conditions thereafter for from 2 to 5 hours.

4. The process for the manufacture of a varnish vehicle which comprises heating crude tall oil acids to a temperature to within a range of from 260 degrees C. to 280 degrees C., vigorously blowing an oxygen liberating gas therethrough at such a rate as to reduce the acid value of the said oil to less than 140, but not less than 130, in from 2 to 8 hours when the reaction temperature is maintained within the said temperature range.

5. The process for the manufacture of a varnish vehicle which comprises heating crude tall oil acids and a polyhydric alcohol selected from the group consisting of glycerine, pentaerythritol, polypentaerythritol, sorbitol, mannitol and the partial esters thereof, to a temperature within the range of from 200 degrees C. to 300 degrees C., blowing air therethrough at such a rate as will maintain an active turbulent agitation of the said oil so as to reduce the acid value of the product resulting to less than a value of 10 in from 2 to 8 hours when held within the said temperature range.

6. The process for the manufacture of a varnish vehicle which comprises heating crude tall oil acids to a temperature within the preferred range of from 200 degrees C. to 300 degrees C., vigorously blowing an oxygen liberating gas therethrough at such a rate as to reduce the acid value of the said oil to less than 140, but not less than 130, in from 2 to 8 hours when the reaction temperature is maintained within the said temperature range, refining the resultant processed oil and recovering thereby an altered tall oil fatty acid of improved drying quality which will, when esterified with polyhydric alcohols, produce drying oils of improved drying rate as compared with similar tall oil esters not so processed.

7. The process for the manufacture of a varnish vehicle which comprises heating crude tall oil acids to a temperature within the range of from 200 degrees C. to 300 degrees C., vigorously blowing an oxygen liberating gas therethrough at such a rate as to reduce the acid value of the said oil to within the range of from 130 to 140 in from 2 to 8 hours when the reaction temperature is maintained within the said temperature range, thereafter vacuum distilling the processed oil acids, and esterifying the said distilled acids with a quantity of an alcohol selected from the group consisting of glycerine, pentaerythritol, polypentaerythritol, sorbitol, mannitol and said polyhydric alcohols incompletely esterified with unsaturated drying oil fatty acids, said quantity being sufficient to produce an oil of acid value less than 10, characterized by improved color, odor, and drying qualities.

8. A process of preparing from crude tall oil acids compositions having improved drying properties which consists in blowing a gas containing oxygen through crude tall oil acids as rapidly as it is possible to do so while maintaining a temperature within the range of 200 degrees C. to 300 degrees C. until the acid value is below 140.

9. A process of preparing from crude tall oil acids compositions having improved drying properties which consists in blowing a gas containing oxygen through crude tall oil acids as rapidly as it is possible to do so while maintaining a temperature within the range of 260 degrees C. to 280 degrees C. until the acid value is below 140.

10. A process of preparing from crude tall oil acids compositions having improved drying properties which consists in blowing a gas containing oxygen through a polyhydric alcohol ester of crude tall oil acids as rapidly as it is possible to do so while maintaining a temperature between 200 degrees C. and 300 degrees C. until the acid value of the reaction mixture is less than 10.

11. A process of preparing from crude tall oil acids compositions having improved drying properties which consists in blowing a gas containing oxygen through a polyhydric alcohol ester of crude tall oil acids as rapidly as it is possible to do so while maintaining a temperature between 260 degrees C. and 280 degrees C. until the acid value of the reaction mixture is less than 10.

WILLIAM C. SPITZER.
RUSSELL T. RYAN.

REFERENCES CITED

The following references are of record in the file of this patent:

UNITED STATES PATENTS

| Number | Name | Date |
|---|---|---|
| 1,938,532 | Patch et al. | Dec. 5, 1933 |
| 2,332,849 | Gruber | Oct. 26, 1943 |